May 20, 1969  A. SUTARUK  3,444,748
DRIVE MECHANISM

Filed Feb. 1, 1967

INVENTOR.
ALEX SUTARUK

ATTORNEYS

INVENTOR.
ALEX SUTARUK

May 20, 1969
A. SUTARUK
3,444,748
DRIVE MECHANISM
Filed Feb. 1, 1967
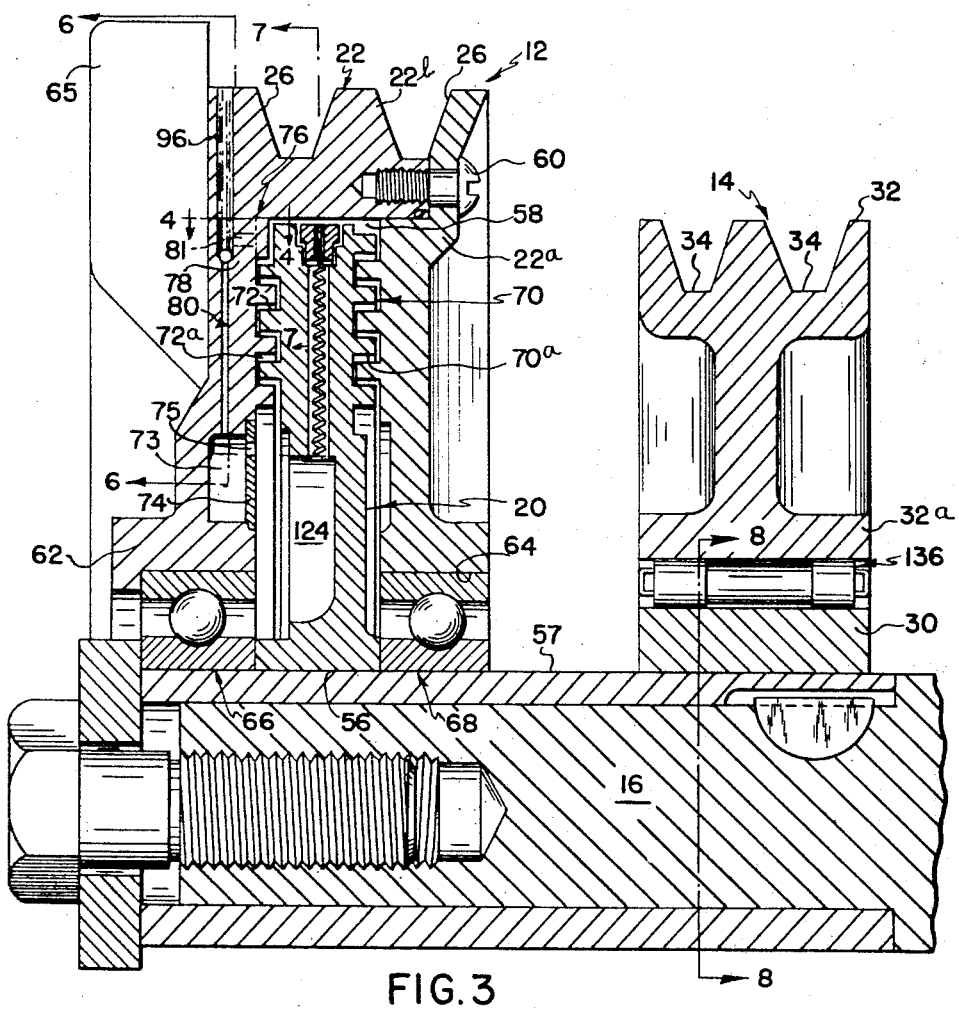
FIG. 3
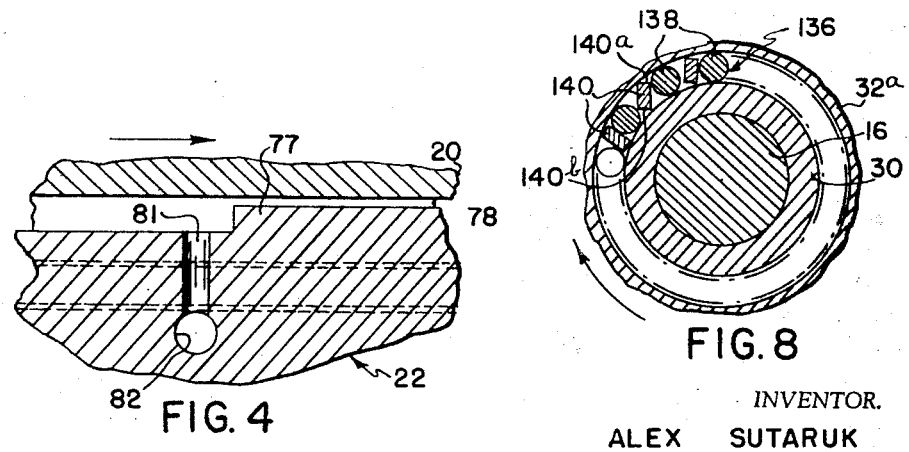
FIG. 4
FIG. 8
INVENTOR.
ALEX SUTARUK
BY
ATTORNEYS United States Patent Office 3,444,748
Patented May 20, 1969

3,444,748
DRIVE MECHANISM
Alex Sutaruk, Hazel Park, Mich., assignor to Eaton Yale & Towne Inc., Cleveland, Ohio, a corporation of Ohio
Filed Feb. 1, 1967, Ser. No. 613,170
Int. Cl. F16h 11/02
U.S. Cl. 74—217                                        17 Claims

ABSTRACT OF THE DISCLOSURE

This application discloses a drive for automotive engine accessories and which drive includes a viscous shear fluid coupling for driving the accessories at a high drive ratio from the engine crankshaft at low engine speeds and an overrunning clutch for driving the accessories at a low drive ratio at high engine speeds. The viscous shear coupling includes elements which effect evacuation of the fluid shear chamber at a predetermined speed at which the overrunning clutch is actuated.

---

The present invention relates to a drive mechanism, and more particularly to a drive mechanism for engine accessories and embodying a dual clutch arrangement through which drive is selectively transmitted to the accessories.

It is an important object of the present invention to provide a new and improved engine accessory drive mechanism which is relatively compact in size, inexpensive to manufacture, and which includes a first clutch for drivingly connecting the engine crankshaft and accessory to drive the accessory at a high drive ratio during a low speed range operation of the vehicle engine and a second clutch for drivingly connecting the engine crankshaft and accessory to drive the accessory at a low drive ratio during a high speed range of vehicle engine operation.

Another object of the present invention is the provision of a new and improved drive mechanism for transmitting drive from a drive shaft to at least one engine accessory and which includes a clutch or coupling and an overrunning clutch arranged to be drive by the drive shaft and wherein the drive is effected through the fluid clutch when the shaft is rotating in a low speed range and through the overrunning clutch when the shaft is rotating in a high speed range.

Another object of the present invention is the provision of a new and improved drive mechanism for driving an accessory from an engine including a viscous fluid clutch or coupling which is operable to transmit drive to the accessory when the engine is operating in a low speed range and the drive therethrough is discontinued when the engine operates in a high speed range and discontinuance of the drive through the viscous fluid clutch establishes the drive for the accessory through an overrunning clutch.

A further object of the present invention is the provision of a new and improved drive mechanism, as noted in the preceding paragraph, wherein a speed responsive member operates to evacuate substantially all the drive transmitting fluid from the working chamber of the fluid coupling to discontinue the drive through the fluid coupling.

Another object of the present invnetion is the provision of a new and improved drive mechanism including relatively rotatable input and output clutch members which have opposed shear surfaces defining a shear space within which a shear fluid is received which cooperates with the shear surfaces to transmit drive between the clutch members and wherein the speed of the output clutch member is controlled by a condition responsive member which regulates the volume of fluid in the shear space and further includes means for discontinuing the drive between the clutch members in response to a condition of operation of the clutch.

A further object of the present invention is the provision of a new and improved drive mechanism, as noted in the next preceding paragraph, wherein the drive between the clutch members is discontinued by operation of a speed responsive member on the input clutch member which operates at a predetermined speed to substantially evacuate all the fluid from the shear space.

A still further object of the present invention is the provision of a new and improved drive mechanism including relatively rotatable input and output members having spaced opposed shear surfaces defining therebetween a shear space within which a fluid shear medium is received and which cooperates with the shear surface to transmit drive therebetween and condition responsive means to control the speed of the output member including a speed responsive member operable in response to a predetermined speed to control the speed of the output member and temperature responsive spring means for controlling the speed at which the speed responsive member operates.

Further objects, advantages, and novel characteristics of the present invention will be apparent to those skilled in the art to which it relates from the following detailed description of the preferred embodiment thereof made with reference to the accompanying drawings forming a part of this specification and wherein:

FIG. 3 is a sectional view of a portion of the drive mechaninm shown in FIG. 1 on an enlarged scale;

FIG. 4 is a sectional view taken approximately along line 4—4 of FIG. 3;

FIG. 8 is a sectional view taken approximately along section line 8–8 of FIG 3.

The present invention provides a drive mechanism for driving a unit, such as an engine accessory of the crankshaft of the engine. According to the illustrated embodiment of the invention, the drive mechanism includes a fluid clutch and an overrunning mechanical clutch operatively driven from the engine crankshaft and which selectively transmit drive to the driven unit through high and low drive ratios, respectively. The drive is effected through the fluid clutch, when the engine is operating in a low speed range, and which drives the accessory through a high drive ratio so that the operational speed of the accessory is maintained above a minimum operational speed. When the engine speed enters a higher speed range, the drive through the uuid clutch is discontinued and the drive is then provided through the overrunning clutch which drives the accessory at a lower drive ratio and prevents the accessory or driven units from operating at speeds in excess of the desired maximum operating speed thereof. Although the drive mechanism according to the present invention, has application in many environments, it is herein shown and described as embodied in a vehicle engine for driving the various accessories thereof.

Figure 1:
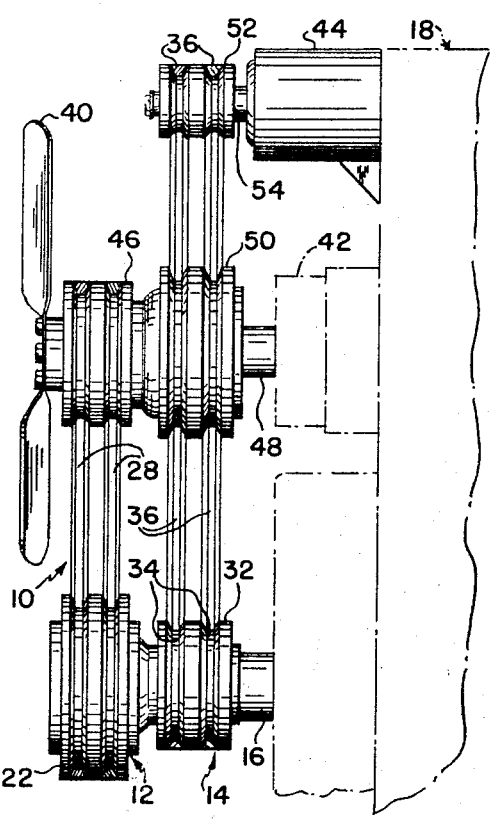
FIG. 1 is an elevational view of a drive mechanism embodying the present invention.

FIG. 1 illustrates a drive mechanism 10 for driving accessories for a vehicle engine. The drive mechanism 10 includes a fluid clutch or coupling 12 and a mechanical overrunning clutch 14. The clutches 12 and 14 are, according to the illustrated embodiment, mounted on the crankshaft 16 of the engine 18. The fluid clutch 12 is of the viscous shear fluid type and includes an input clutch member 20 (FIG. 3) drivingly connected with the crankshaft 16 and which is rotated thereby and which transmits drive to the output clutch member 22 through a viscous fluid shear medium. The exterior periphery of the output clutch member 22 has a pair of V-shaped grooves 26 which are adapted to receive a pair of V-shaped drive belts 28 therein which transmit drive to the accessories.

The overrunning clutch 14 includes an input clutch member 30 drivingly connected to the crankshaft 16 and an output clutch member 32 which has a pair of V-shaped annular grooves 34 extending around the periphery thereof. A pair of drive belts 36 extend about the output clutch member 32 and transmit drive between the clutch 14 and the accessories.

The clutches 12 and 14 are controlled to drive accessories associated with engine 18 and which in the illustrated embodiment, include, by way of example, a fan 40, a water pump 42 and an alternator 44. The fan 40, water pump 42 and alternator 44 perform their well-known functions. However, in order to perform these functions properly for an appreciable length of time, they must operate within specified speeds. This requirement is complicated by the fact that engine 18 operates at various speeds and the primary factor governing engine speed is the desired speed of movement of the vehicle. Consequently, the drive mechanism 10 must compensate for the various engine speeds and provide for operation of the accessories within acceptable limits.

Figure 2:
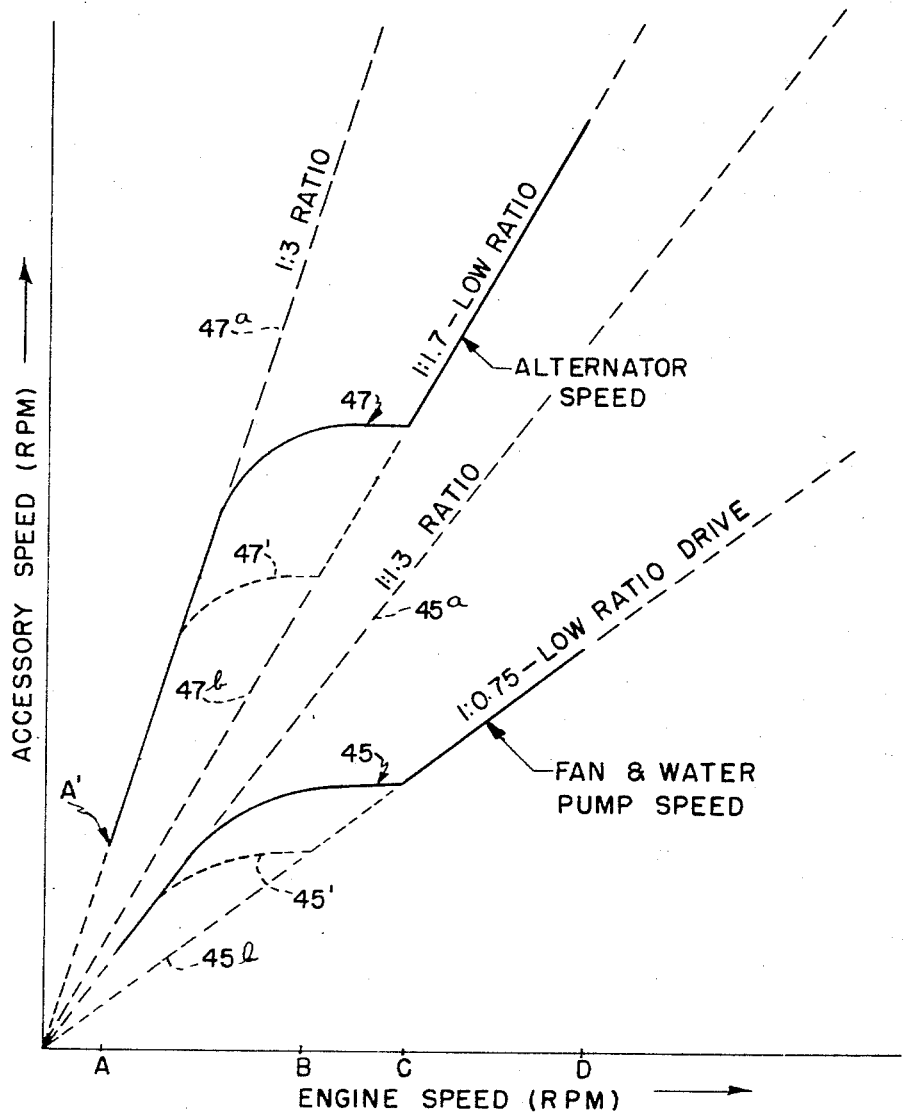
FIG. 2 is a graph illustrating the speed of the accessories in relation to speed of the engine.

The drive for fan 40, water pump 42, and alternator 44 is represented graphically in the graph forming FIG. 2 which is a plot of accessory speed (r.p.m.) versus engine speed (r.p.m.). The speed of fan 40 and water pump 42 is represented by line 45. The drive is transmitted through a high drive ratio to the fan 40 and water pump 42 by fluid clutch 12 when the engine is operating in the low speed range represented by engine speed between points A and C. The drive to the accessories 40, 42 when engine 18 is operating in the high speed range, i.e., between points C and D, is through the overrunning clutch 14 at a lower drive ratio. The speed of alternator 44 is represented by line 47 on the graph of FIG. 2. Comparison of lines 45 and 47 illustrates that the alternator is driven at higher speeds than the pump 42 and fan 40 for the same engine speed. This is accomplished by providing a relatively higher drive ratio for the alternator than for the pump and fan.

The high drive ratio from fluid clutch 12 to the fan 40 and water pump 42 is provided through the belts 28 which pass around a double groove pulley 46. Pulley 46 is connected to drive a shaft 48 which is suitably supported by engine 18 and carries the fan 40 at the left-hand end thereof, as viewed in FIG. 1. The water pump 42 is connected to the right-hand end of shaft 48. The relative diameters of the output fluid clutch member 22 and the pulley 46 are such as to provide, in the illustrated embodiment, a high drive ratio of 1:1.3, that is, one revolution of pulley 22 provides for 1.3 revolutions of pulley 46. The high drive ratio of 1:1.3 is represented by the dash line 45a in FIG. 2.

Alternator 44 is driven through a drive having a high drive ratio from the fluid clutch 12 through a pulley 50, also journaled on shaft 48, intermediate pulley 46 and water pump 42. Pulley 50 drives a pulley 52 journaled on the end of an alternator drive shaft 54 through the belts 36. The alternator 44 preferably is driven at a higher speed than the pump 42 and fan 40 and, consequently, the relative diameters of pulleys 50 and 52 are such that in the illustrated embodiment, they provide a high drive ratio of 1:3 is represented by dash line 47a in FIG. 2. 16 provides three revolutions of the pulley 52. The drive ratio of 1:3 is represented by dash line 47a in FIG. 2.

Rotation of pulley 50 by pulley 46 causes the output overrunning clutch member 32 to rotate relative to crankshaft 16 due to the engagement of belts 36 with the grooves 34 in the periphery of clutch member 32, causing the clutch 14 to overrun the crankshaft 16. The drive to the accessories 40, 42 and 44 continues through fluid clutch 12 and the high drive ratio arrangement heretofore described until the crankshaft exceeds a predetermined speed, represented by point C of FIG. 2. This ensures that during the low speed range of operation of engine 18, i.e., between points A and C, the high drive ratio will drive the fan 40, the pump 42, and alternator 44 at sufficient speed to ensure proper operation thereof.

When the speed of crankshaft 16 reaches point C of FIG. 2, the drive through the fluid clutch 12 is discontinued by means which will be described hereinafter and the accessories are then driven through the overrunning clutch 14 through a drive arrangement providing a low drive ratio which ensures that the accessories will not exceed a predetermined maximum speed. The overrunning clutch 14 is engaged when the output member 32 thereof is rotating at or below the speed of the crankshaft 16. This comes about in one instance when the drive through the fluid clutch 12 is discontinued which causes the accessories and, in particular, the pulley 50, to slow down. Slowdown of pulley 50 which is driving overrunning clutch member 32, reduces the speed of the clutch member 32. When the output clutch member 32 is rotating at or below the speed of crankshaft 16, the overrunning clutch 14 engages and drives the accessories.

The fan 40 and water pump 42 are driven from the clutch 14 through a drive arrangement having a low drive ratio. This includes the belt 36 and pulley 50 which now drive the shaft 48 to which the fan 40 and water pump 42 are connected. The relative diameters of the output clutch member 32 and pulley 50 are such as to provide, in the illustrated embodiment, a drive ratio of 1:0.75, that is, one revolution of member 32 provides ¾ of a revolution of pulley 50. The drive ratio of 1:0.75 is represented by dash line 45b in FIG. 2. The alternator 44 is driven from output clutch member 32 by the belts 36 which pass around pulley 50, 52. The relative diameters of the output clutch member 32 and pulley 52 are such as to provide in the illustrated embodiment a drive ratio of 1:1.7 which is represented by dash line 47b in FIG. 2, that is, one revolution of member 32 provides 1.7 revolutions of pulley 52. As long as crankshaft 16 is rotating in the high speed range, i.e., between points C and D in FIG. 2, the drive to the accessories will be through clutch 14. When the speed of crankshaft 16 drops below the speed represented by point C, at which the speed of crankshaft 16 enters the lower speed range, the output clutch member 32 begins to overrun crankshaft 16 and the drive is established through the fluid clutch 12 once again.

The fluid clutch 12 may take a number of forms but in the illustrated embodiment, part of which is shown on an enlarged scale in FIG. 3, it includes the input clutch member 20 which is in the form of a disc-shaped member. The disc-shaped input clutch member 20 has a central opening 56 which receives a sleeve 57. The input clutch member 20 is preferably pressed onto sleeve 57 and sleeve 57 is preferably keyed on the crankshaft 16 so that there will be no relative rotation between clutch member 20 and crankshaft 16. The input clutch member 20 when driven by crankshaft 16 rotates in a working chamber 58 defined by the hollow output clutch member 22.

The output clutch member 22 is preferably formed in two separable sections, 22a and 22b, to facilitate assembly. Sections 22a and 22b are interconnected by a plurality of fasteners 60. The output clutch member 22 has a central hub 62 having an opening 64 therethrough. A pair of anti-friction bearing assemblies 66 and 68 are received in opening 64 and mount the output clutch member 22 for rotation relative to the input clutch member 20 and the crankshaft 16. The part 22b has a plurality of cooling fins 65 along one side to dissipate heat from clutch 12.

The fins 65 rotate with output clutch member 22 and direct air thereabout to dissipate heat of the drive mechanism 10.

The input and output clutch members 20 and 22 have a plurality of interdigitated lands and grooves 70, 72 along their opposing opposite axial sides and define therebetween shear spaces 70a and 72a, respectively. A suitable fluid shear medium, such as silicone fluid, cooperates with the interdigitated lands and grooves 70 and 72 when in shear spaces 70a and 72a to transmit torque from the input clutch member 20 to the output clutch member 22 to drive the output clutch member 22. The volume of shear fluid in shear spaces 70a and 72a determines the torque transmitted from the input clutch member 20 to the output clutch member 22.

The output clutch member 22 has a fluid reservoir 73. Reservoir 73 is in the form of an annular groove formed in part 22b adjacent hub 62. The groove is closed along one side by a closure plate 74 which is suitably sealed to prevent fluid leakage. One or more openings 75 are provided in plate 74 through which fluid is directed from the reservoir 73 into the working chamber 58. At start-up of the clutch, fluid in fluid reservoir 73 flows into the working chamber 58 through openings 75 as a result of the centrifugal force acting on the fluid. The fluid in reservoir 73 flows into the working chamber 58 and into the shear spaces 70a and 72a until the fluid clutch is fully engaged.

Figure 5:
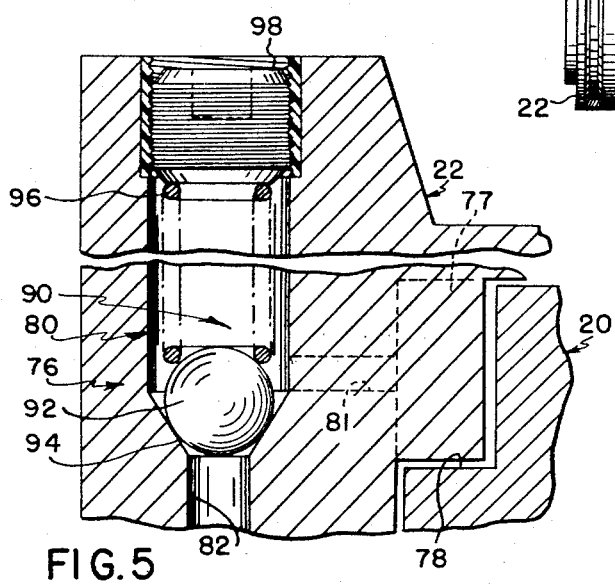
FIG. 5 is a sectional view of a portion of the drive mechanism illustrated in FIG. 3 on an enlarged scale.

The fluid clutch 12, according to the present invention, provides means for controlling the speed of the output clutch member 22 and, in turn, the speed of accessories 40, 42 and 44 when the engine is operating in the low speed range, i.e., between points A and C in FIG. 2. The speed control is provided by a speed responsive means 76, shown in FIG. 5, and carried by the output clutch member 22 and which operates in response to the speed of the output clutch member 22 to control the volume of fluid in shear spaces 70a and 72a. The speed responsive means 76 includes a pumping abutment 77 on the inner axial side of part 22b of the input clutch member 22. The input clutch member 22 is recessed at 78 to provide a wiping step within which the pumping abutment 77 operates. Cooperating with the pumping abutment 77 is a conduit means 80 in the part 22b of the input clutch member 22 providing a fluid passageway from the working chamber 58 to the reservoir 73. Conduit means 80 includes an axially extending passageway 81 and a radially extending passageway 82. Passageway 81 opens into the working chamber 58 slightly ahead of the pumping abutment 77 to receive fluid impacted against the pumping abutment 77 during relative rotation of the input and output clutch members 20 and 22. Passageway 81 opens at its opposite end into radially extending passageway 82 which, in turn, communicates at its inner end with fluid reservoir 73.

The speed of the output clutch member 22 is controlled by controlling the flow of fluid into reservoir 73 through conduit means 80. As stated heretofore, fluid in reservoir 73 may be continually returned to working chamber 58 and by making the size of inlet opening 75 relatively smaller than the size of the fluid passageway 82, the latter can direct a greater volume of fluid per unit time into the reservoir 73 than is directed from the reservoir 73 back into the working chamber 58.

Fluid flow into reservoir 73 is controlled by a speed responsive valve means 90 in fluid passageway 82. The speed responsive valve means 90 comprises a ball-shaped valve 92 which is biased into engagement with a valve seat 94 formed in passageway 82 by a spring means 96. The outer end of passageway 82 is larger in diameter than the inner portion thereof so as to provide the seat 94 at the intersection of the larger and smaller portions of passageway 82. The upper end of passageway 82 is closed by a fill plug 98 which is removably secured in the passageway 82 and against which one end of the preloaded coil spring 96 abuts. The other end of the spring 96 abuts against the upper surface of ball valve 92 and operates to bias the valve into engagement with valve seat 94. When the valve is seated, the shear fluid directed by the pumping abutment 77 through fluid passageway 82 is blocked from flowing into the reservoir 73. When the output clutch member 22 attains a predetermined speed of operation set by the rate of spring means 96, the centrifugal force acting on ball 92 unseats ball valve 92 from valve seat 94 against the bias of spring 96 and permits fluid to flow from the working chamber 58 into the reservoir 73 at a faster rate than it can flow from the reservoir 73 into the working chamber 58 through opening 75. The net reduction of the volume of fluid in shear spaces 70a and 72a reduces the speed of the output clutch member 22. When the speed of the output clutch member returns to the predetermined maximum speed, the spring 96 overcomes the centrifugal force and seats ball valve 92 in valve seat 94 and blocks flow of fluid into the reservoir 73. The speed responsive valve means 90 is thus continuously operable to limit the maximum speed of operation of the fluid clutch 12 and, in turn, the speed of accessories 40, 42 and 44 when the drive is through the fluid clutch 12.

Although in the illustrated embodiment the valve means 94 is disclosed as a ball-type valve, it should be apparent that other types of valves could be utilized. For example, the ball valve 92 could be replaced by a cylindrically shaped valve member with a corresponding change in the valve seat 94 to accommodate the different shaped valve means. Also, a valve having a tapered body portion could be employed whereby the valve would not completely close when urged to its innermost position by spring 96. In such a situation, the valve would provide at all times a metered flow of fluid through passageway 82 into the reservoir 73.

The maximum accessory speed provided by the fluid clutch 12 is governed by the rate of spring means 96. The maximum accessory speed provided by spring 96 is represented by lines 45 and 47 of FIG. 2. There are situations where it is advantageous to vary the maximum speed of the accessories, particularly the speed of fan 40 and water pump 42. For example, the speed of fan 40 and water pump 42 does not have to be as high during winter driving as during summer driving due to the reduced cooling required of engine 18. To provide for a lower accessory speed requirement during cold weather operations and a higher accessory speed during warm weather operations, the present invention provides a speed and temperature responsive flow control means 100, shown in FIG. 6. The flow control means 100 operates in response to speed of the output fluid clutch member 22 and the temperature in reservoir 73 to control the volume of fluid in shear spaces 70a and 72a and provide two maximum accessory speeds during engine operation in the low speed range.

The flow control means 100 comprises a ball valve 102. Ball valve 102 is arranged to seat in valve seat 94' to block flow through fluid passageway 82'. The valve seat 94' is similar to seat 94 of FIG. 4 but is located further inward of the axially extending fluid passageway 82. The valve actuator 104 includes a stem 106 connected at one end to the ball valve 102 and the opposite lower end thereof extends into the fluid reservoir 73. The lower end of stem 106 has an abutment 108 to retain a flat spring 110 which is mounted on stem 106.

The spring 110 is a bimetal temperature responsive spring which biases the ball valve 102 into engagement with seat 94'. The valve 102 opens when the speed of the output clutch member 22 is such that the centrifugal force overcomes the biasing force of spring 110. The biasing force exerted by spring 110 on valve 102 varies in accordance with the temperature ambient thereto. When the temperature ambient to spring 110 is below a preset temperature, such as would exist during cold weather, the spring 110 bows outwardly from its full line position toward valve 102, as indicated by the dash line in FIG. 6 which line is somewhat exaggerated for illustration purposes. When the spring 110 is so positioned, it exerts less closing force on the valve 102 and consequently a lower centrifugal force is required to open the ball valve 102. As a result, the maximum speed of the output clutch member is lower. The resulting lower maximum accessory speed is indicated by lines 45' and 47' on the graph of FIG. 2.

Figure 6:
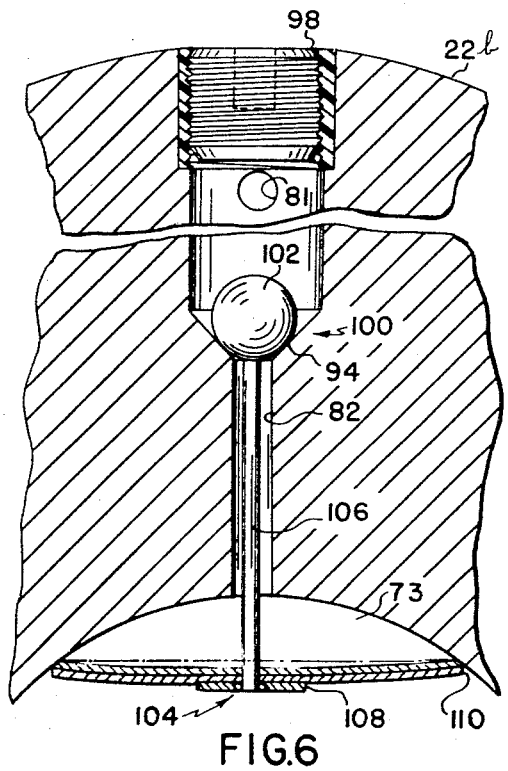
FIG. 6 is a sectional view of the drive mechanism taken approximately along line 6—6 of FIG. 3 but showing a modification thereof.

During summer operation, the temperature ambient to spring 110 would be such as to set the spring 110 in the position illustrated in full lines in FIG. 6 wherein the spring 110 is only slightly bound outwardly valve 102. In such a position, the force exerted by the spring is greater and the centrifugal force required to unseat spring 110 from seat 94 increases. As a result, the valve opens at a higher speed of the output fluid clutch member 22. The speed of the accessories could follow lines 45 and 47 of the graph of FIG. 2. However, as discussed in connection with the speed responsive valve means 90, shown in FIG. 4, the spring 110 could be designed to provide any desired accessory speed.

As stated heretofore, the fluid clutch 12 operates to control the drive to the accessories until the engine r.p.m. reaches point C in the graph of FIG. 2. At point C, the drive through the fluid clutch 12 is discontinued and the lower drive ratio to the accessories is provided by the overrunning clutch 14. The drive through the fluid clutch 12 is discontinued by operation of speed responsive means 114 on the input clutch member 20. The speed responsive means 114 may, for example, be similar to the speed responsive means disclosed and claimed in my copending application, Ser. No. 527,255, filed Feb. 14, 1966, now Patent No. 3,403,764.

Figure 7:
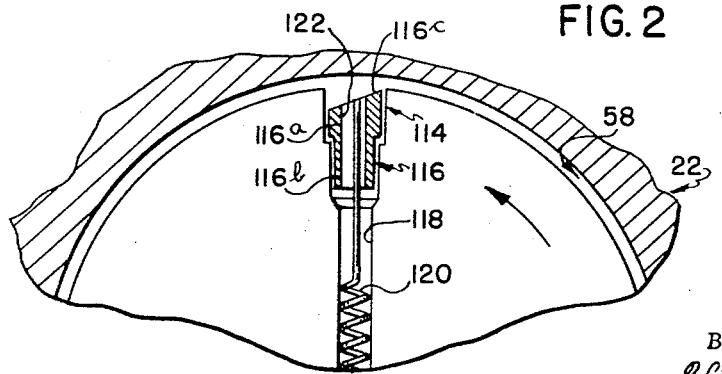
FIG. 7 is a sectional view taken approximately along line 7—7 of FIG. 3.

Speed responsive means 114 comprises a pumping member 116 which is mounted for reciprocable movement in a radially extending passageway 118 provided in the input clutch member 20. The pumping member 116 comprises a head portion 116a and a shank portion 116b which is reduced in diameter with respect to head portion 116a. The fluid passageway 118 within which the pumping member 116 is mounted has a corresponding cross-sectional configuration to accommodate the pumping element therein and limit its innermost position of travel. The outer periphery or surface 116c of the pumping chamber 116 is inclined as shown in FIG. 7 and provides a fluid impacting surface. The pumping member 116 is normally maintained in the position illustrated in FIG. 7 so that the impact surface 116c is disposed within the periphery of the input clutch member 20 by a spring means 120. When the speed of the input clutch member 20 and the speed of the engine approaches point C on the graph of FIG. 2, the centrifugal force acting on the pumping member 116 overcomes the bias of spring 120 and moves the pumping element radially outwardly so that impact surface 116c is in the working chamber and is in a position so that the fluid in working chamber 58 impact thereagainst upon relative rotation of the input and output clutch members. The impacted fluid is directed into a fluid passageway 122 extending radially through the pumping member 116. Passageway 122 communicates with a fluid reservoir 124 through fluid passageway 118. The pumping member 116 when in its pumping position operates to substantially evacuate all the fluid from the working chamber 58 into the reservoir 124, and the drive between the input clutch member 20 and the output clutch member 22 is discontinued.

The speed at which the pumping member 116 commences to evacuate fluid is determined by the rate of spring 120 and can accordingly be controlled by the selection of the spring 120. In the illustrated embodiment, the spring 120 permits the pumping member 116 to move outwardly under the influence of centrifugal force so that the surface 116c moves into the working chamber and begins the evacuation of fluid from the working chamber as the speed of the engine approaches point C. When the speed of the engine is at point C, the pumping member 116 has evacuated sufficient fluid from working chamber 58 to substantially reduce the transmission of torque between the clutch members. It should be apparent that the speed responsive means 114 operates independently of the speed control means 90 and 100 and that the pumping member 116 evacuates the fluid gradually from working chamber 58 providing for a smooth drive change-over from the fluid clutch 12 to the overrunning clutch 14.

As the speed responsive means 114 discontinues the drive through the fluid clutch 12, the speed of the overrunning clutch member 32 becomes equal to or less than the speed of the crankshaft 16. When the relative speeds of the clutch member 32 and shaft 16 are as described, the overrunning clutch 14 locks up and commences to drive the accessories 40, 42 and 44. As the drive for the accessories is established through the overrunning clutch 14, the input clutch member 20 of the fluid clutch continues to rotate at the speed of shaft 16 and the output clutch member 22 is driven by belts 28 at a lower speed. Pumping member 116 continues to evacuate fluid from the working chamber 58 until substantially all the fluid is removed. The evacuation of the fluid from the working chamber 58 during drive through the overrunning clutch 14 provides several advantages. One advantage being that since there is no fluid between the relatively rotating input and output clutch members of the fluid clutch, no drag is created therebetween which would cause an expenditure of horepower and reduce the efficiency of operation of the drive mechanism. Another important advantage gained by the fluid evacuation is that the shear fluid will not overheat and break down due to the high speeds of the input and output clutch members during high speed operation of the engine since it is maintained in the fluid reservoir 124. The drive is re-established through the fluid clutch 12 when the speed of the input clutch member 20 drops to around point C, whereat the spring 120 overcomes the centrifugal force and moves the pumping element 116 into its nonpumping position illustrated in FIG. 6. With the pumping element withdrawn, the fluid flows from the reservoir 124 and fills the shear spaces. When drive is transmitted through the fluid clutch 12, output clutch member 32 rotates faster than the shaft 16 and the drive through clutch 14 is discontinued.

Any suitable type of overrunning clutch may be provided as long as it provides for lock-up when the output part of the clutch is rotating at or below the speed of the crankshaft 16. In the illustrated embodiment, the overrunning clutch 14 comprises the input clutch member 30 preferably pressed onto sleeve 57 keyed to crankshaft 16 so that relative rotation therebetween is prevented. A hub portion 32a of the output clutch member 32 is arranged to rotate relative to the input clutch member 30 and the crankshaft 16.

The clutch 14 includes a lock-up mechanism, indicated generally as 136, which operates to effect lock-up between the input clutch member 30 and the output clutch member 32.

The lock-up mechanism 136 includes a plurality of balls or rollers 138. The balls or rollers 138 have sprags 140 located between adjacent balls or rollers 138. Each of the sprags 140 has upper and lower cam surfaces 140a and 140b, respectively, which are adapted to respectively engage the hub 132 and the input clutch member 30. The arrangement of rollers and sprags is such that when the output clutch member 32 is rotating relative to the crankshaft 16, the sprags are maintained out of locking engagement with output clutch member 32. When the clutch or output clutch member 32 is rotating at or below the speed of the crankshaft 16, the relative rotation between the clutch members 30 and 32 causes the cam surfaces 140a and 140b to be wedged into engagement between the clutch members and effect a lock-up of the clutch and drive the accessories 40, 42 and 44 at the low drive ratio as described. The drive mechanism has been described heretofore with reference to engine start-up and moving through the low speed range into the high speed range and the operation of the drive mechanism has been described through this sequence of operation. It should be appreciated, however, that the drive mechanism is reversible and operates in reverse as the engine speed decreases and moves through the high drive range through the low speed range.

From the foregoing, it should be apparent that by the present invention a relatively compact, inexpensive and effective drive mechanism has been provided to control the speed of operation of the engine accessories.

Having described my invention, I claim:

1. A drive mechanism for transmitting drive from a drive shaft to at least one accessory comprising first and second clutch means drivingly connected to said shaft, said first clutch means comprising a fluid clutch and said second clutch means comprising an overruning clutch, means drivingly connecting said fluid clutch to said accessory to transmit drive therebetween at a first drive ratio, means drivingly connecting said overrunning clutch to said accessory to transmit drive therebetween at a second drive ratio which is lower than said first drive ratio, means for effecting drive through said fluid clutch when said shaft is rotating in a first speed range, and means for effecting drive through said overrunning clutch when said drive shaft is rotating in a second speed range which is greater than said first speed range.

2. A drive mechanism as defined in claim 1 wherein said fluid clutch includes condition responsive means for controlling the speed of said accessory when the drive is through said fluid clutch, and said condition responsive means includes a speed responsive member movable in response to a predetermined speed of said fluid clutch and operable to reduce the output speed of said fluid clutch.

3. A drive mechanism as defined in claim 2 wherein said condition responsive means further includes temperature responsive means for controlling the speed at which said speed responsive member operates.

4. A drive mechanism as defined in claim 1 wherein said means for effecting drive through said overruning clutch includes means for discontinuing the drive through said fluid clutch when said shaft is in said second speed range, and means for establishing drive through said overrunning clutch in response to discontinuing the drive through said fluid clutch.

5. A drive mechanism as defined in claim 1 wherein said fluid clutch includes relatively rotatable input and output clutch members, one of said clutch members providing a working chamber within which at least a portion of the other clutch member rotates, a fluid medium in said working chamber which cooperates with said clutch member to transmit torque therebetween, and means for discontinuing drive through said fluid clutch including speed responsive pump means for evacuating fluids from the working chamber in response to a predetermined speed of said output clutch member.

6. A drive mechanism for transmitting drive from a drive shaft to at least one accessory comprising fluid and overrunning clutch means operatively connected to said shaft and said accessory and operable to drive the accessory from said shaft, said fluid clutch comprising a fluid input clutch member operatively connected to said shaft to be driven thereby, and an output fluid clutch member rotatable relative to said input fluid clutch member and relative to said drive shaft, one of said fluid clutch members providing a working chamber within which at least a portion of the other of said fluid clutch members rotates, opposed shear surfaces on said fluid clutch members and defining therebetween a shear space adapted to receive a fluid shear medium which cooperates with said shear surfaces to transmit drive from said input fluid clutch member to said output fluid clutch member upon rotation of said drive shaft, said overrunning clutch member comprising an input overrunning clutch member operatively connected to said drive shaft for rotation therewith and an output overrunning clutch member rotatable relative to said input clutch member and said drive shaft, means for effecting a drive connection between said input overrunning clutch member and said output overrunning clutch member, means drivingly connecting said fluid clutch output member and said overrunning clutch output member with said accessory, and means for effective driving of said accessory through said fluid clutch in response to a first speed of operation of said shaft and through said overrunning clutch in response to a second speed of operation of said shaft.

7. A drive mechanism as defined in claim 6 including means for controlling the speed of said fluid output clutch member including a member movable at a predetermined speed to control the volume of fluid in said shear space.

8. A drive mechanism as defined in claim 6 further including a fluid reservoir on said fluid output clutch member, first and second fluid conducting means for directing fluid from said working chamber to said reservoir and from said reservoir to said working chamber, respectively, and speed responsive valve means for controlling flow of the shear fluid through said first fluid conducting means and operable to provide for flow into said reservoir at a predetermined speed of said fluid output clutch member.

9. A drive mechanism as defined in claim 8 further including a pumping abutment on said fluid output clutch member and having a part disposed in said working chamber, a fluid passageway adjacent said pumping abutment and operable to direct fluid impacted against said pumping abutment to said fluid reservoir, and said speed responsive valve means is mounted in said fluid passageway to control the flow of fluid through said passageway.

10. A drive mechanism as defined in claim 9 further including temperature responsive means including a bimetal spring biasing said valve means to a closed position.

11. A drive mechanism as defined in claim 6 further including means for discontinuing the drive between said fluid input clutch member and said fluid output clutch member when said shaft is operating at said second speed.

12. A drive mechanism as defined in claim 11 wherein said means for discontinuing drive between said fluid clutch members includes speed responsive pump means on said fluid input clutch member and operable in response to the speed of said fluid input clutch member to move into said working chamber and substantially remove the shear fluid from said shear space.

13. A drive mechanism comprising a drive shaft, an input member operatively connected to said drive shaft to be driven thereby, an output member rotatable relative to said input member, said output member defining a working chamber within which at least a portion of the periphery of said input member is disposed, opposed shear surfaces on said input and output members and defining therebetween a shear space adapted to receive a fluid shear medium which cooperates with said shear surfaces to transmit drive from said input member to said output member upon rotation of said drive shaft, means defining a fluid reservoir chamber, means for effecting flow of fluid from said working chamber to said reservoir chamber including an impact pumping element, and a second pumping element operable at a predetermined speed to evacuate substantially all shear fluid from said shear space.

14. A drive mechanism as defined in claim 13 further including first and second fluid conducting means for directing fluid from said working chamber to said reservoir and from said reservoir to said working chamber, respectively, and speed responsive valve means for controlling flow of shear fluid effected by said impact pump means through said first fluid conducting means into said reservoir.

15. A drive mechanism as defined in claim 14 wherein said second pumping element comprises a speed responsive pumping member on said input member operable to substantially remove the shear fluid from said shear space in response to the speed of said input member.

16. A drive mechanism as defined in claim 15 wherein said speed responsive pumping member operates at a speed in excess of the speed at which said valve means operates.

17. A drive mechanism comprising a drive shaft, an input member operatively connected to said drive shaft to be driven thereby, an output member rotatable relative to said input member, said output member defining a working chamber within which at least a portion of the periphery of said input member is disposed, opposed shear surfaces on said input and output members defining a shear space therebetween and cooperable with a fluid shear medium within said shear space to provide a shear type fluid drive between said members, a fluid reservoir chamber adjacent said shear space, fluid conducting means communicating said fluid reservoir chamber and said shear space, a valve member supported on one of said members in said fluid conducting means and movable substantially radially in response to a predetermined speed of said one member to establish fluid flow between said shear space and said fluid reservoir chamber, temperature-responsive spring means biasing said valve member in opposition to said movement, said spring means being a bimetal spring which applies a variable biasing force to said valve member depending upon the temperature ambient to said spring, and a mechanical overrunning clutch operatively connected with said shaft, a first belt and pulley drive arrangement operatively connecting said output member with an accessory drive unit to drive the accessory drive unit at a high speed ratio, a second belt and pulley drive arrangement operatively connecting the mechanical clutch with said accessary drive unit for driving the accessory drive unit at a low speed ratio, and means for discontinuing the drive between said input and output members at a predetermined speed of operation of said shaft and for effecting a drive of said accessory drive unit through said mechanical overrunning clutch at shaft speeds above said predetermined speed.

References Cited

UNITED STATES PATENTS

| 3,017,977 | 1/1962 | Becker et al. | 192—48 |
| 3,144,922 | 8/1964 | Weir | 192—58 |
| 3,259,220 | 7/1966 | Roper | 192—58 |

FOREIGN PATENTS 1,008,500  10/1965  Great Britain.

FRED C. MATTERN, JR., *Primary Examiner.*

JAMES A. WONG, *Assistant Examiner.*

U.S. Cl. X.R.

192—45, 48, 58